W. N. ROSSBERG & G. E. SHERIDAN.
HYDROMETALLURGY OF COPPER.
APPLICATION FILED DEC. 20, 1917.
1,292,075.
Patented Jan. 21, 1919.
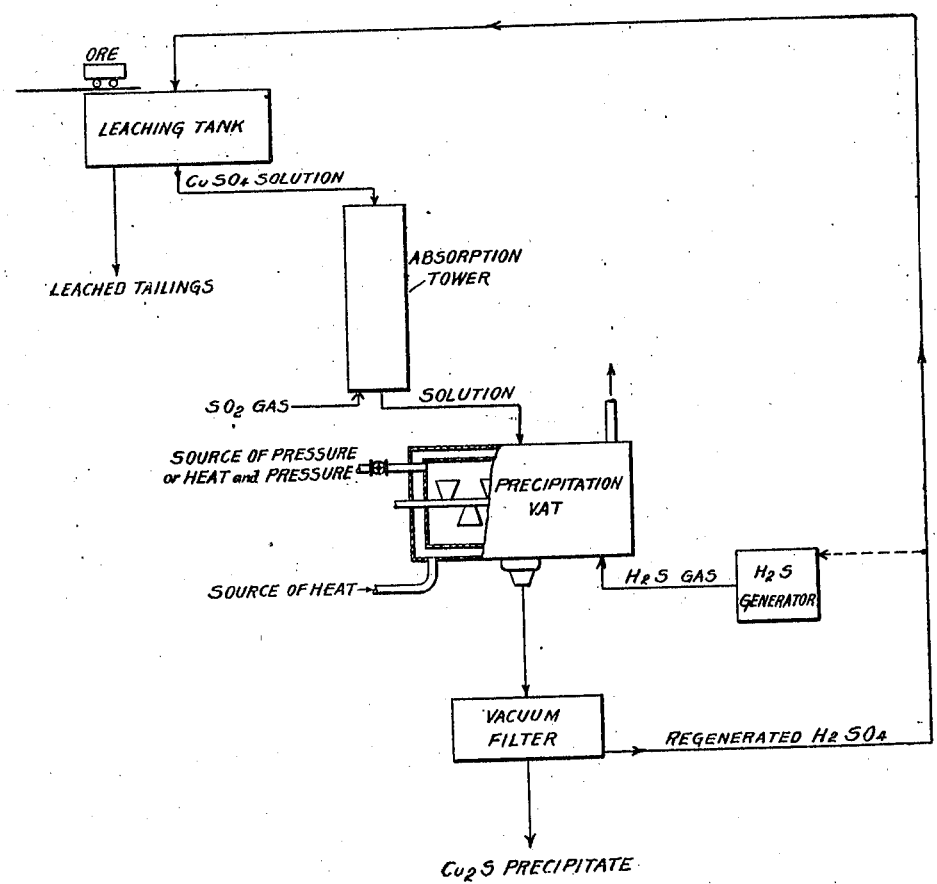

UNITED STATES PATENT OFFICE.

WILLIAM N. ROSSBERG AND GUY E. SHERIDAN, OF BUTTE, MONTANA.

HYDROMETALLURGY OF COPPER.

1,292,075.

Specification of Letters Patent. Patented Jan. 21, 1919.

Application filed December 20, 1917. Serial No. 208,021.

*To all whom it may concern:*

Be it known that we, WILLIAM N. ROSSBERG and GUY E. SHERIDAN, both citizens of the United States, and both residents of Butte, county of Silverbow, and State of Montana, have invented certain new and useful Improvements in Hydrometallurgy of Copper; and we do hereby declare the following to be a full, clear, and exact description of the invention, such as will enable others skilled in the art to which it appertains to make and use the same.

The present invention relates to the recovery of copper from oxidized copper ores principally in the form of cuprous sulfid; and more particularly it relates to such recovery by the leaching of the oxidized copper ores with sulfuric acid and the recovery of the copper principally as the cuprous sulfid from the resulting sulfate solutions, the acid held in combination with the copper being regenerated and being thus made available for leaching further amounts of the ore.

We have found that the recovery of copper as sulfid from copper sulfate solutions can be effected with about one-half the amount of hydrogen sulfid or its equivalent precipitating agent, commonly employed if the precipitation is carried on in the presence of sufficient sulfur dioxid (sulfurous acid) to give the proper reducing conditions; and that under these conditions the copper will be precipitated in the cuprous condition, as cuprous sulfid, and additional amounts of sulfuric acid will at the same time be formed from the sulfurous acid.

The accompanying drawing diagrammatically illustrates, by means of a conventional flow sheet, an arrangement of apparatus for the execution of the various steps of the method of our present invention. The various treatment steps and the apparatus employed are appropriately legended on the drawing, and the source, destination and direction of travel of the various products produced in the course of the process are designated by lines and arrows. The signification of the legends, lines and arrows in the drawing will be clear from the following description.

In the carrying out of the invention, the oxidized copper ore, which may be a native ore, or a roasted sulfid ore or concentrate, etc., is leached with sulfuric acid of any desired strength. The acid may advantageously be that which is regenerated later on in the process. The leaching may be effected or promoted by agitation with air or mechanically, by percolation, or by other suitable methods or combinations thereof. The solution can be progressively increased in strength by extracting fresh batches of ore with the more dilute solutions, in case solutions of the desired strength are not available by a single leaching operation. So also, wash waters and the dilute solutions which may result from washing out or extracting the last of the copper from previously leached batches may be used in leaching fresh batches. The copper solution is separated from the gangue matter by decantation or filtration. Solutions of high copper content insure economical handling.

If the copper sulfate solution carries considerable iron, this should be removed, *e. g.*, by adding copper oxid and agitating with air, or by adding any other suitable base, or by other means known to the art; and the precipitate removed from the solution by decanting or filtering. This procedure, however, will usually be necessary only when considerable iron is present.

After having obtained the copper solution it is impregnated with sulfur dioxid gas in any suitable manner as by passing the gas through a number of suitable apertures in the bottom of vats or tanks containing the proper solution and thereby causing it to bubble up through the solution, or by spraying the copper solution down a tower against an upflowing stream of the sulfur dioxid gas, or by otherwise bringing about the necessary intermixture of the liquor and gas.

The copper solution, impregnated with the sulfur dioxid gas, is then treated with hydrogen sulfid gas. The quantity of hydrogen sulfid required is determined by the amount of copper present in solution, taking into account that the copper is to be precipitated as the cuprous sulfid so that only one-half the precipitating agent is necessary that would be required for the precipitation, in the usual way, of the cupric sulfid. The treatment of the liquor with hydrogen sulfid may be brought about by injecting or bubbling the gas into and through the liquor, or in absorption towers, or otherwise, in a manner analogous to that used in the impregnation with the sulfur dioxid gas. The reactions take place in either cool or warm solutions but are materially hastened by the aid of heat or pressure. The heating of the solution or liquor may be done economically by using the hot sulfur dioxid gases from roasting furnaces or sulfur burners.

The impregnation of the copper sulfate solution with sulfur dioxid, and the precipitation of cuprous sulfid by hydrogen sulfid may both take place, in accordance with our present invention, at ordinary temperature and pressure. While heat promotes the reactions, good results are attained at normal temperatures. Pressure, like heat, aids the reactions, but is not essential and can be dispensed with. When it is desirable to use either heat or pressure a slight increase in temperature above the normal, for example, a temperature not exceeding 160° F., and a pressure not exceeding 30 to 40 lbs. per sq. inch are ample. The use of hot sulfur dioxid gas from roasting furnaces or sulfur burners for the impregnation of the copper sulfate solution may be used for heating the solution, or the precipitation vat may be jacketed for the use of any suitable source of heat. The desired pressure may be conveniently obtained as a result of the hydrogen sulfid gas used, or any suitable means may be used for connecting the interior of the closed precipitation vat to a source of pressure or to a source of heat and pressure.

A slight excess of sulfur dioxid should at all times be present so as to insure the precipitation of the copper in the cuprous condition. In order to insure economical absorption of the sulfur dioxid gas in solutions of high copper content, it may be necessary to alternate the impregnation of the copper solution with sulfur dioxid gas and with hydrogen sulfid, this impregnation being effected by such procedures as have been outlined above.

From appearances, it would seem that copper is probably first precipitated to a certain extent as metallic copper which is almost instantly converted to the cuprous sulfid. While the intermediate compounds formed by the action of sulfur dioxid and hydrogen sulfid gases upon sulfate of copper in solution are very unstable, making these reactions problematical, the amount of copper precipitated and the amount of acid formed from known quantities of sulfids indicates that the following equation is a probable summation of the reactions; but we do not wish to limit ourselves by any theoretical explanation of what the actual reaction may be, and we give this equation merely as a probable summation and explanation of the reactions which take place.

$$2CuSO_4 + H_2SO_3 + H_2S + H_2O = Cu_2S + 3H_2SO_4.$$

It will be noted that the sulfuric acid held in combination with the copper is regenerated and that an additional amount of sulfuric acid is also generated amounting to about fifty per cent. of that regenerated from its combination with the copper. That is to say, about one and one-half times as much sulfuric acid is set free or generated during the precipitation as was used in dissolving the copper as sulfate from the ore. The process is thus one which produces additional amounts of sulfuric acid from the sulfur dioxid used, as well as one which results in the recovery of the copper as the cuprous sulfid. This acid which is regenerated, or which is generated, during the precipitation, after separation from the precipitate, is available for leaching fresh quantities of ore for the production of further amounts of copper sulfate solution; and it is also available for the treatment of sulfids such as iron sulfid or calcium sulfid in order to generate therefrom hydrogen sulfid.

Instead of using gaseous hydrogen sulfid for the precipitation of the copper, the sulfid may be set free within the solution by adding a decomposable sulfid, such as an alkali or alkaline earth sulfid, or even iron sulfid, to the solution, and decomposing it therein and forming the hydrogen sulfid therefrom. For example, a finely divided sulfid, preferably calcium sulfid, is added to the solution of copper sulfate, in quantities determined by its precipitating power and the amount of copper to be precipitated, keeping in mind that the copper will be precipitated in the cuprous condition so that only about one-half of the precipitating agent is necessary that would ordinarily be used in the precipitation of cupric sulfid. The sulfid can be added directly to the solution if free acid and ferric sulfate are absent; if, however, the copper solution contains free acid, or anything that will decompose the sulfid, such as ferric sulfate or an acid sulfate, the solution should be impregnated with sulfur dioxid previous to the addition of the finely divided calcium sulfid or other sulfid. If the solution is free from acid, ferric sulfate, etc., it may be impregnated with sulfur dioxid gas in tanks or towers or otherwise after the addition of the calcium sulfid. In other words, the hydrogen sulfid gas will be liberated within the solution and will act as a precipitant therein. As with precipitating by the use of gaseous hydrogen sulfid, the precipitation by the hydrogen sulfid generated in the solution may be promoted by stirring or agitating or by otherwise securing the necessary intimacy and uniformity of distribution and inter-mixture of the precipitating agent within the solution.

The decomposition of the added sulfid will be accelerated by the presence of free acid. Heat will also hasten the reaction, as in the case of precipitation of the copper by added hydrogen sulfid gas, and the heating may be effected in the same or similar manner to that previously referred to. Mechanical agitation, as noted above, also facilitates the keeping of the undecomposed sulfid in suspension and in contact with the copper in solution.

The reactions which take place, as indicated by the results obtained, seem to be those indicated by the following equation:

$$CaS + 2CuSO_4 + H_2SO_3 + H_2O = Cu_2S + CaSO_4 + 2H_2SO_4$$

As indicated by this equation the copper is precipitated together with calcium sulfate in the form of a composite precipitate containing about 40% copper. At the same time, the sulfuric acid is regenerated to the extent that it has been held in combination with the copper, and this acid is thus made available, after separation from the precipitate, for leaching fresh quantities of ore.

The process of the present invention may be utilized for the removal and recovery of copper (and other metals belonging to the hydrogen sulfid group, such as arsenic and antimony) e. g., from liquors obtained in the leaching of zinc ores with sulfuric acid, and the zinc sulfate solutions thereby purified at the same time that the copper is recovered as the cuprous sulfid. The zinc sulfate solutions containing copper sulfate, may thus be freed from the copper, and the copper recovered as a precipitate, in the manner above described, by treating the solution with hydrogen sulfid in the presence of an excess of sulfur dioxid, a sufficient amount of acid being present to prevent precipitation of the zinc sulfid.

The sulfur dioxid gas which is used in the process of the present invention may be produced in any suitable or well known manner. It is usually available as a waste product from roasting operations, and the roaster gases may be the source of this gas. Where such roaster gases are not available, the sulfur dioxid may be prepared by the combustion of sulfur or pyrites, or from special roasting operations.

The hydrogen sulfid gas, when gaseous hydrogen sulfid is used, can similarly be prepared from any of the common or available sources of this gas. It may thus be generated from iron sulfid by the action of sulfuric acid, and, for this purpose, a part of the regenerated sulfuric acid can be used. Inasmuch as the precipitation by gaseous hydrogen sulfid results in the generation of one and one-half times as much sulfuric acid as was combined with the copper, and as is required for the extraction of a corresponding amount of copper, a considerable amount of sulfuric acid is thus available for use for the generation of hydrogen sulfid, or for other purposes for which it may be desired.

Accordingly, from one view point, the process of the present invention is a process for the manufacture of sulfuric acid from sulfur dioxid, the amount of acid thus made amounting, as above pointed out, to about one-half of that which is set free from its combination with the copper, and being in addition to that which is so set free from its combination with the copper.

Where, instead of gaseous hydrogen sulfid, its equivalent in the form of iron sulfid or an alkali or alkaline earth sulfid is used, and decomposed within the solution by sulfur dioxid or other acid or acid salt, there is still regenerated an amount of sulfuric acid corresponding to that in combination with the copper and to that required for the leaching of a corresponding amount of copper from further batches of the oxidized ores.

It will thus be seen that the process of the present invention is one of notable economy, a minimum amount of hydrogen sulfid gas or its equivalent being required for the precipitation of the copper as cuprous sulfid; this amount being, as above pointed out, about one-half of that commonly used in the precipitation of the ordinary copper (cupric) sulfid from copper sulfate solutions. Moreover, since the precipitation is effected with a minimum of the hydrogen sulfid, a smaller amount of this gas is required to be absorbed by the solution, or liberated therein, with the result that the absorption takes place more readily and with the further important result that less of the hydrogen sulfid has to be handled so that large excesses of the gas can be avoided. There is thus a greater efficiency in the use of the hydrogen sulfid or of the equivalent sulfid precipitating agent, as well as a notable economy in the amount of the precipitating agent required.

Furthermore, it will be noted that the precipitation of the copper as the cuprous sulfid ($Cu_2S$) instead of as the cupric sulfid ($CuS$) results in the production of a precipitate which is richer in copper.

The cuprous sulfid precipitate obtained is easily treated by familiar metallurgical operations for the recovery of metallic copper therefrom. Where the precipitate is obtained in the form of a composite precipitate of cuprous sulfid and calcium sulfate, it may be similarly treated in any suitable manner for the recovery of the metallic copper therefrom.

Aside from the economy and efficiency incident to the practice of the invention in the manner described, the resulting solution is one relatively or substantially free from hydrogen sulfid and its accompanying objectionable features. A possible explanation of this may be that any small excess of hydrogen sulfid, over and above that required for the precipitation of the cuprous sulfid, is neutralized by the excess sulfur dioxid present and thus converted into an inocuous condition. Since an excess of sulfur dioxid is maintained during the process, there is an excess present to take care of any small excess of hydrogen sulfid over and above that which is required for the precipitation operation. Since sulfur dioxid gas is in many instances a waste product and a nuisance, it is usually a product readily obtained in sufficient amount at a minimum of expense.

It will further be seen that the invention presents, from one aspect, a cyclic process in which sufficient sulfuric acid is regenerated from the copper sulfate to extract further amounts of copper ore; and that, in addition, where hydrogen sulfid is used, there will be regenerated further amounts of sulfuric acid from the sulfur dioxid which will be available for use either for extracting copper ore or for the formation of hydrogen sulfid, e. g., by decomposing alkaline sulfids or iron sulfid. This decomposition, moreover, may take place within the solution of copper sulfate when the decomposable sulfid is added thereto, in the manner above described.

We claim:—

1. The method of recovering copper from oxidized ores which comprises leaching the ore to obtain a solution containing the copper as copper sulfate, and precipitating the copper from such solution as cuprous sulfid in the presence of sulfur dioxid and thereby regenerating further amounts of sulfuric acid; substantially as described.

2. The method of recovering copper from oxidized ores which comprises leaching the ore with sulfuric acid to form a copper sulfate solution, separating such solution from the gangue, precipitating the copper from such solution as cuprous sulfid in the presence of an excess of sulfur dioxid, and thereby also regenerating sulfuric acid, and utilizing the sulfuric acid thus regenerated for leaching further amounts of ore; substantially as described.

3. The method of recovering copper from oxidized ores which comprises leaching the ore to obtain a solution of the copper as sulfate, impregnating such solution with sulfur dioxid, and precipitating the copper in the presence of an excess of sulfur dioxid as cuprous sulfid; substantially as described.

4. The method of recovering copper from oxidized ores which comprises leaching the ore to obtain a solution of the copper as sulfate, impregnating such solution with sulfur dioxid, and precipitating the copper as cuprous sulfid by means of hydrogen sulfid, an excess of sulfur dioxid being maintained during the precipitation; substantially as described.

5. The method of recovering copper from oxidized ores which comprises leaching the ore to obtain a solution of copper as sulfate, impregnating such solution with sulfur dioxid, and precipitating the copper as cuprous sulfid by means of hydrogen sulfid generated within such solution from a suitable soluble sulfid; substantially as described.

6. The method of recovering copper from copper sulfate solutions which comprises precipitating the copper as cuprous sulfid in the presence of sulfur dioxid; substantially as described.

7. The method of recovering copper from copper sulfate solutions which comprises precipitating the copper therefrom as cuprous sulfid by treatment with hydrogen sulfid in the presence of sulfur dioxid, and thereby regenerating further amounts of sulfuric acid; substantially as described.

8. The method of recovering copper from its sulfate solutions which comprises impregnating such solutions with sulfur dioxid and precipitating the copper as cuprous sulfid by treatment with hydrogen sulfid in the presence of an excess of sulfur dioxid sufficient to insure precipitation of the copper in the cuprous condition; substantially as described.

9. The method of recovering copper from copper sulfate solutions which comprises impregnating such solutions with sulfur dioxid and precipitating the copper therefrom as cuprous sulfid by treatment with hydrogen sulfid generated within the solution, an excess of sulfur dioxid being present during the precipitation; substantially as described.

10. The method of recovering copper and removal of arsenic, antimony and other metals of the hydrogen sulfid group from zinc sulfate solutions or zinc electrolytes containing copper, and other metals of the hydrogen sulfid group, which comprises impregnating such solutions with sulfur dioxid and precipitating the metals of the hydrogen sulfid group therefrom as sulfids in the ous condition without precipitation of zinc sulfid; substantially as described.

11. The method of recovering copper from oxidized ores, which comprises leaching the ore with sulfuric acid to obtain a solution containing the copper as copper sulfate, precipitating the copper from such solution as cuprous sulfid in the presence of sulfur dioxid by adding hydrogen sulfid thereto, and thereby regenerating the sulfuric acid combined with the copper and added amounts of acid from the sulfur dioxid, leaching further amounts of ore with part of the regenerated acid and decomposing decomposable sulfids with part of the regenerated acid and thereby forming further amounts of hydrogen sulfid; substantially as described.

In testimony whereof we affix our signatures.

WILLIAM N. ROSSBERG.
GUY E. SHERIDAN.